US012756021B2

(12) United States Patent
Park et al.

(10) Patent No.: US 12,756,021 B2
(45) Date of Patent: Oct. 6, 2026

(54) ELECTRODE FOR LITHIUM SECONDARY BATTERY AND MANUFACTURING METHOD THEREOF

(71) Applicant: LG ENERGY SOLUTION, LTD., Seoul (KR)

(72) Inventors: Joon Sun Park, Daejeon (KR); Taek Soo Lee, Daejeon (KR); Man Hyeong Kim, Daejeon (KR); Min Hyuck Choi, Daejeon (KR); Guk Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 612 days.

(21) Appl. No.: 18/272,720

(22) PCT Filed: Dec. 22, 2022

(86) PCT No.: PCT/KR2022/021021
§ 371 (c)(1),
(2) Date: Jul. 17, 2023

(87) PCT Pub. No.: WO2023/132531
PCT Pub. Date: Jul. 13, 2023

(65) Prior Publication Data

US 2024/0088453 A1 Mar. 14, 2024

(30) Foreign Application Priority Data

Jan. 7, 2022 (KR) ........................ 10-2022-0002814

(51) Int. Cl.
*H01M 10/42* (2006.01)
*H01M 4/02* (2006.01)
(Continued)

(52) U.S. Cl.
CPC ..... *H01M 10/4235* (2013.01); *H01M 4/0404* (2013.01); *H01M 4/139* (2013.01); *H01M 2004/021* (2013.01)

(58) Field of Classification Search
CPC ...... H01M 4/0404; H01M 4/13; H01M 4/139; H01M 10/4235; H01M 2004/021
See application file for complete search history.

(56) References Cited

U.S. PATENT DOCUMENTS

2002/0197535 A1 12/2002 Dudley et al.
2012/0115030 A1 5/2012 Tanaka et al.
(Continued)

FOREIGN PATENT DOCUMENTS

CN 111129506 A 5/2020
CN 112331903 A 2/2021
(Continued)

OTHER PUBLICATIONS

Office Action of Sep. 15, 2025 issued in the counterpart European Patent Application No. 22919068.1.
(Continued)

*Primary Examiner* — Scott J. Chmielecki
(74) *Attorney, Agent, or Firm* — Morgan, Lewis & Bockius LLP

(57) ABSTRACT

Disclosed herein relates to an electrode for a lithium secondary battery and a manufacturing method thereof, and since the electrode for a lithium secondary battery is provided with an auxiliary coating layer containing inorganic particles, a phenolic compound, and a binder at the end of an electrode mixture layer containing an electrode active material, thereby improving energy density of the battery due to an improvement in thickness deviation at the end of the electrode mixture layer, and preventing lithium from being precipitated at the end of the electrode, especially the
(Continued)

negative electrode, due to increase in the adhesive strength of the separator at the end of the electrode, it has an advantage of excellent safety.

15 Claims, 6 Drawing Sheets

(51) Int. Cl.
*H01M 4/04* (2006.01)
*H01M 4/139* (2010.01)

(56) References Cited

U.S. PATENT DOCUMENTS

| | | | | |
|---|---|---|---|---|
| 2016/0043373 | A1* | 2/2016 | Arishima | H01M 4/13 429/246 |
| 2020/0136133 | A1 | 4/2020 | Umehara | |
| 2020/0350540 | A1 | 11/2020 | Han et al. | |
| 2021/0036332 | A1 | 2/2021 | Kawamoto et al. | |
| 2021/0043979 | A1 | 2/2021 | Kudo et al. | |
| 2021/0050577 | A1 | 2/2021 | Ka et al. | |
| 2021/0151732 | A1* | 5/2021 | Ahn | B05C 5/0254 |
| 2021/0210761 | A1 | 7/2021 | Mimura | |

FOREIGN PATENT DOCUMENTS

| | | | |
|---|---|---|---|
| JP | 2005-509247 | A | 4/2005 |
| JP | 5772397 | B2 | 9/2015 |
| JP | 2020-072007 | A | 5/2020 |
| JP | 2021-026885 | A | 2/2021 |
| KR | 10-2013-0024766 | A | 3/2013 |
| KR | 10-2017-0087053 | A | 7/2017 |
| KR | 10-2017-0093343 | A | 8/2017 |
| KR | 10-2017-0100376 | A | 9/2017 |
| KR | 10-2017-0100378 | A | 9/2017 |
| KR | 10-2019-0021698 | A | 3/2019 |
| KR | 10-2019-0064507 | A | 6/2019 |
| KR | 10-2035826 | B1 | 10/2019 |
| KR | 10-2020-0049640 | A | 5/2020 |
| WO | 2017/163846 | A1 | 9/2017 |

OTHER PUBLICATIONS

Office Action dated Aug. 13, 2024 issued in Japanese Patent Application No. 2023-543450.
Extended European Search Report dated Jan. 8, 2025 issued in European Patent Application No. 22919068.1.
International Search Report (with translation) and Written Opinion dated Mar. 29, 2023 issued in corresponding International Patent Application No. PCT/KR2022/021021.
Office Action dated Apr. 27, 2026 issued in the corresponding Chinese Patent Application No. 202280011323.3.

* cited by examiner

[FIG. 1]
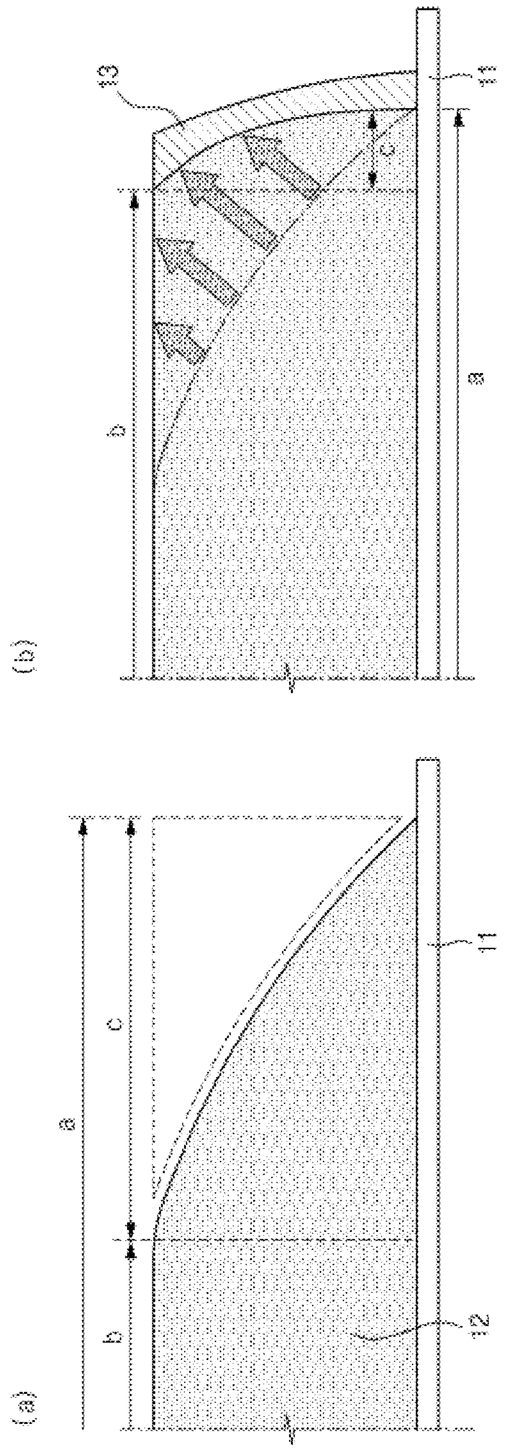

[FIG. 2]
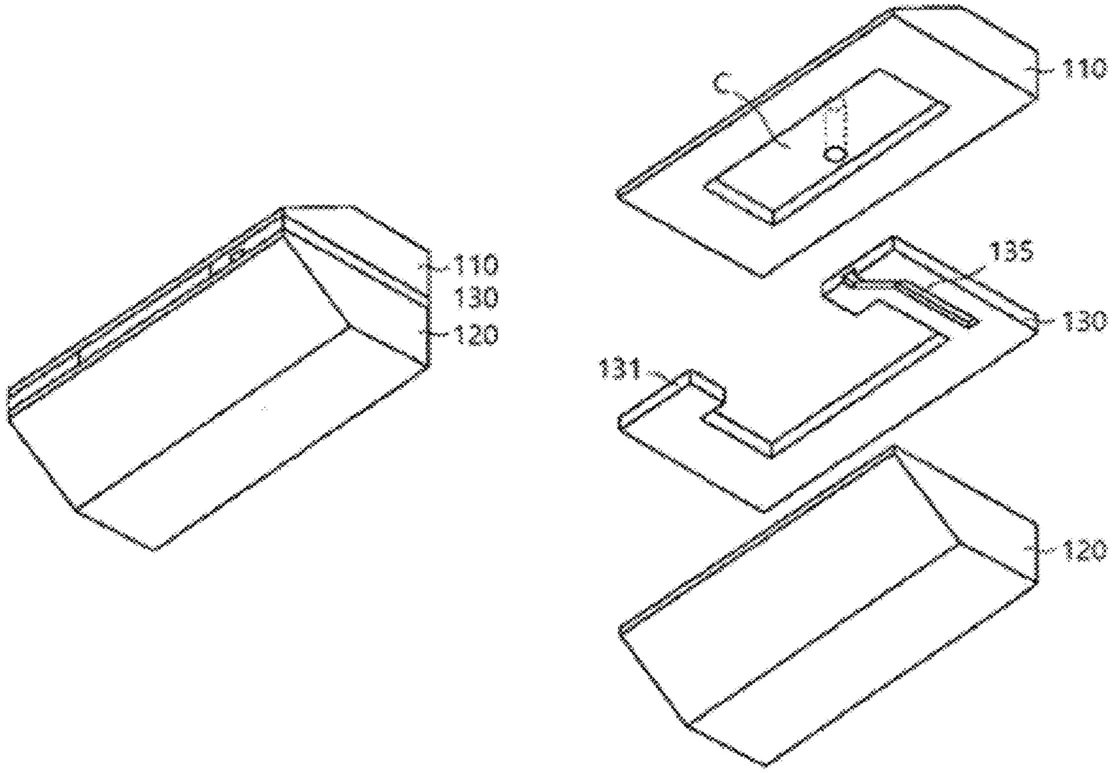

[FIG. 3]
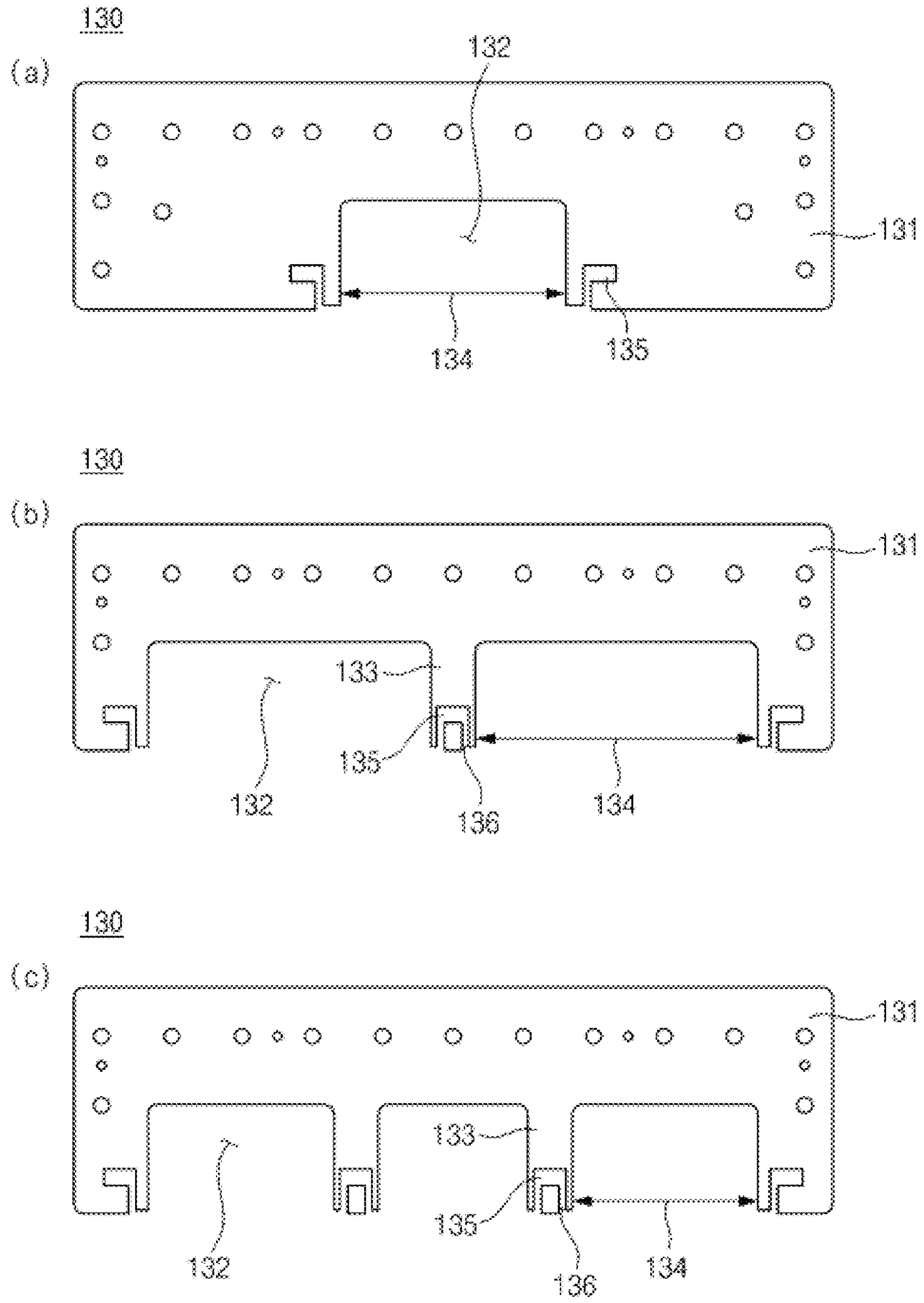

[FIG. 4]
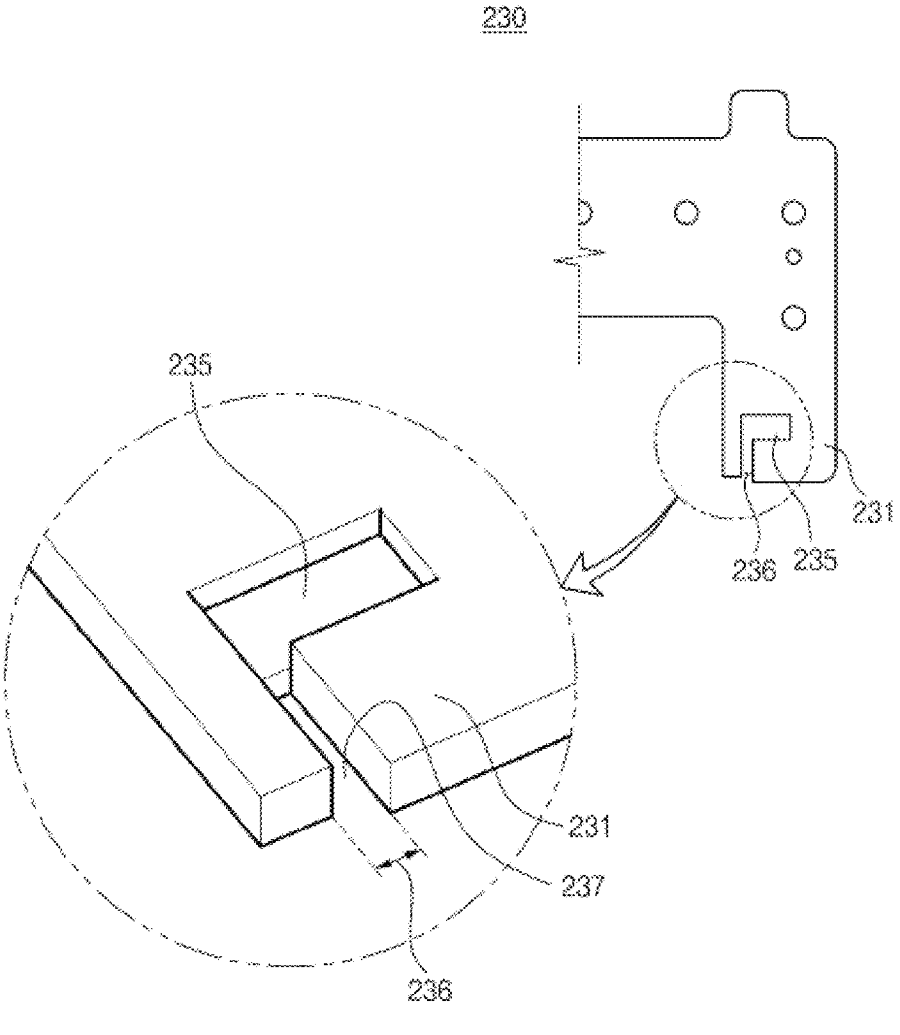

[FIG. 5]
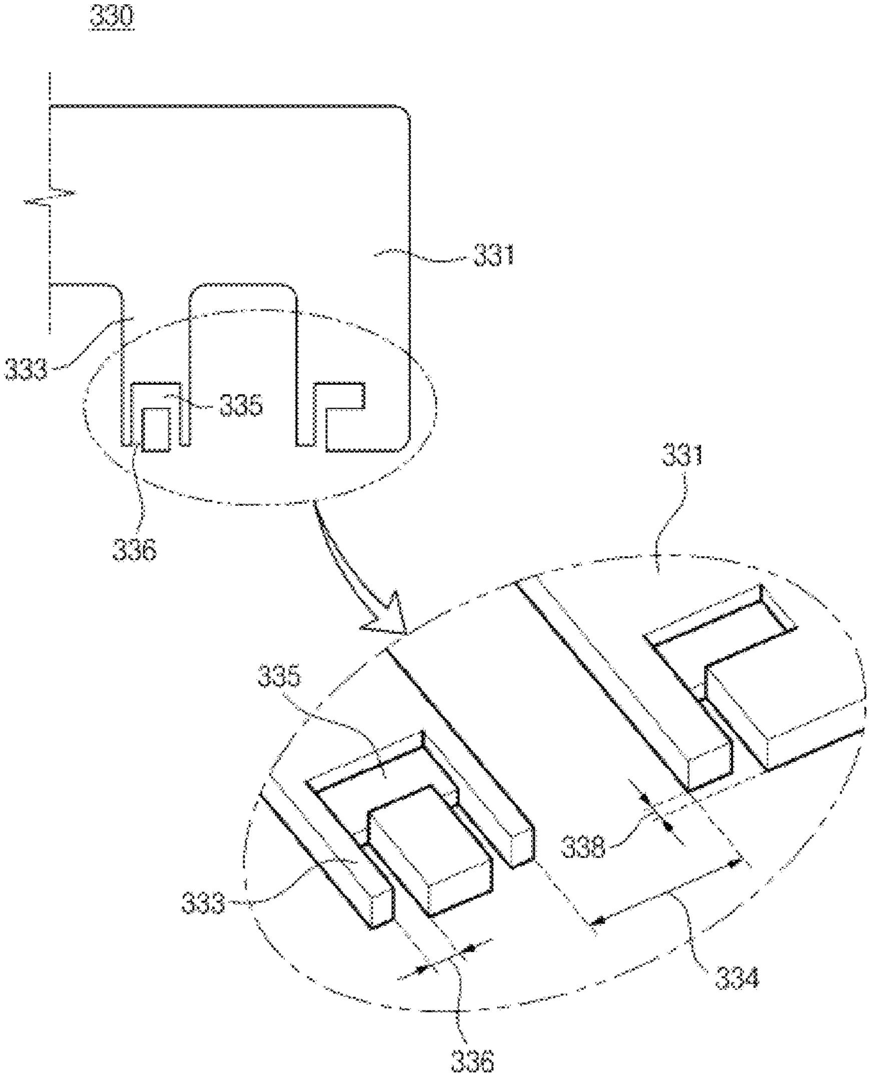

[FIG. 6]
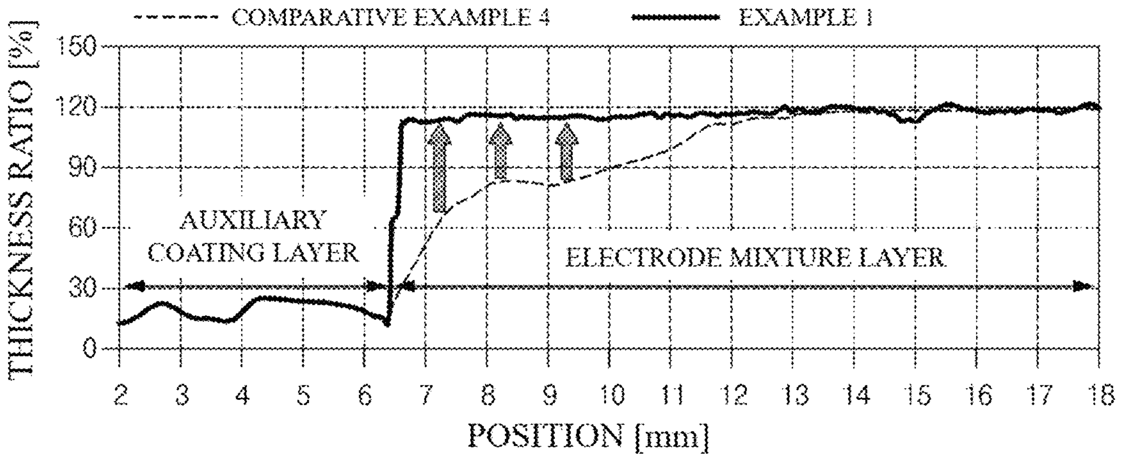
[FIG. 7]
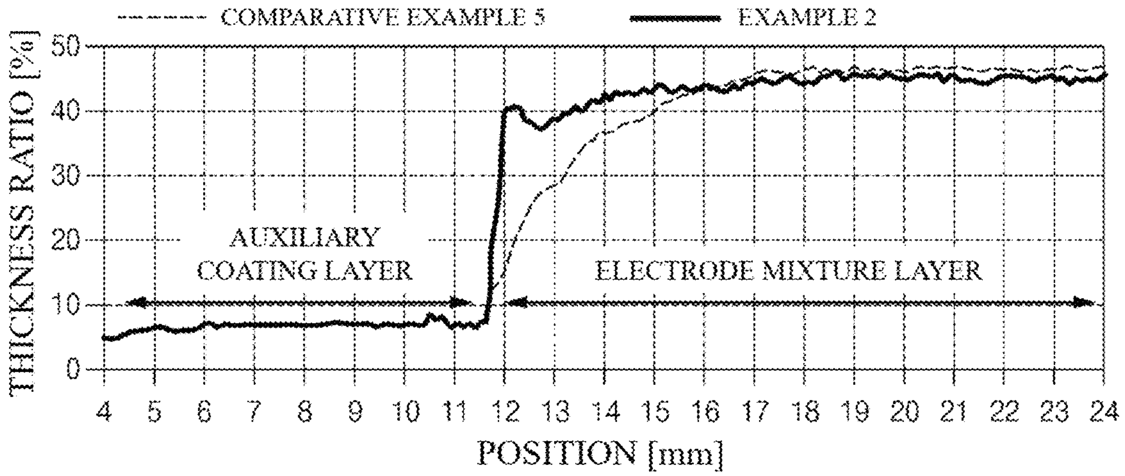

ELECTRODE FOR LITHIUM SECONDARY BATTERY AND MANUFACTURING METHOD THEREOF

TECHNICAL FIELD

The present invention relates to an electrode for a lithium secondary battery and a manufacturing method thereof.

This application claims the benefit of priority based on Korean Patent Application No. 10-2022-0002814 filed on Jan. 7, 2022, and the entire contents of the Korean patent application are incorporated herein by reference.

Background Technology of the Invention

Recently, secondary batteries have been widely applied not only to small devices such as portable electronic devices, but also to medium and large devices such as battery packs or power storage devices of hybrid vehicles and electric vehicles.

Such a secondary battery is a power generation element capable of charging and discharging with a laminated structure of a positive electrode/a separator/a negative electrode. In general, a positive electrode includes a lithium metal oxide as a positive electrode active material, and a negative electrode includes a carbon-based negative electrode active material such as graphite, etc. so that lithium ions emitted from the positive electrode are occluded into the carbon-based negative electrode active material of the negative electrode during charging, and lithium ions contained in the carbon-based negative electrode active material are occluded into a lithium metal oxide of the positive electrode during discharging, thereby having a configuration in which charging and discharging are repeated.

One of the factors that determine the performance of a secondary battery is a capacity ratio of active materials included in the positive and negative electrodes, respectively. The capacity ratio of each electrode active material can be expressed as a N/P ratio, where the N/P ratio is the total capacity of the negative electrode calculated by considering the capacity per area and/or weight of the negative electrode divided by the total capacity of the positive electrode calculated by considering the capacity per area and/or weight of the positive electrode. Since the N/P ratio has a significant effect on the safety and the capacity of the battery, it is generally adjusted to have a value of 1 or more.

However, since a sliding phenomenon is induced at the end of an electrode mixture layer containing an active material during the manufacture of the positive electrode and the negative electrode, it is difficult to constantly satisfy the N/P ratio of the positive electrode and the negative electrode, thereby degrading the electrical performance of the battery, and particularly, there may be a problem in which lithium is precipitated at the end of the negative electrode, causing safety to be reduced.

DESCRIPTION OF THE INVENTION

Technical Problem

Accordingly, an object of the present invention is to prevent an inversion of a N/P ratio of a positive electrode and a negative electrode for a lithium secondary battery from occurring, thereby preventing the deterioration of the electrical performance of a secondary battery, as well as to provide a technology that can further improve the safety of the battery.

Technical Solution

To solve the above-described problems, in an exemplary embodiment, the present invention provides an electrode for a lithium secondary battery, including: an electrode current collector; an electrode mixture layer provided on the electrode current collector, and containing an electrode active material; and an auxiliary coating layer provided on the electrode current collector, and located at the end of an electrode mixture layer, wherein the electrode mixture layer has a deviation (|a-b|) between the length of the surface contacting an electrode current collector (a) and the length of the surface not contacting an electrode current collector (b) of 8 mm or less.

Here, the auxiliary coating layer may include an inorganic particle, a phenolic compound, and a binder.

The inorganic particle may include one or more kinds of aluminum mineral such as boehmite, gibbsite, diaspore, alunite, and nepheline.

In addition, the phenolic compound may include one or more kinds among Tannic acid, Baicalein, Luteolin, Taxifolin, Myricetin, Quercetin, Rutin, Catechin, Epigallocatechin gallate, Butein, Piceatannol, Pyrogallic acid, Ellagic acid, Amylose, Amylopectin, and Xanthan gum.

Moreover, the auxiliary coating layer may include inorganic particles in an amount of 50 parts by weight or more based on the total weight.

In addition, the auxiliary coating layer may form a single layer with the electrode mixture layer in a structure surrounding the end surface of the electrode mixture layer, and may have a thickness of 70% to 100% ratio of the average thickness of the electrode mixture layer.

In addition, the end of the electrode mixture layer may have an inclination angle of 50° or more.

Furthermore, in an exemplary embodiment, the present invention provides a manufacturing method of an electrode for a lithium secondary battery, including: preparing of an electrode having an auxiliary coating layer disposed at the end of an electrode mixture layer containing an electrode active material by simultaneously coating an electrode slurry containing an electrode active material, and an auxiliary coating composition on an electrode current collector, wherein the electrode mixture layer has a deviation (|a-b|) between the length of the surface contacting an electrode current collector (a) and the length of the surface not contacting an electrode current collector (b) of 8 mm or less.

Here, the auxiliary coating composition may include an inorganic particle, a phenolic compound, and a binder.

In addition, the inorganic particles may be included in an amount of 50 parts by weight or more based on the total weight.

Moreover, the phenolic compound may include one or more kinds among Tannic acid, Baicalein, Luteolin, Taxifolin, Myricetin, Quercetin, Rutin, Catechin, Epigallocatechin gallate, Butein, Piceatannol, Pyrogallic acid, Ellagic acid, Amylose, Amylopectin, and Xanthan gum.

In addition, the phenolic compound may be included in an amount of 0.1 to 5 parts by weight based on the total weight.

Furthermore, the coatings of the electrode slurry and the auxiliary coating composition are simultaneously discharged by a slot die, and the slot die may include: an upper die having a chamber accommodating an electrode slurry; a lower die facing the upper die; a plate-shaped shim member located between the upper die and the lower die, having a hollow connected to a chamber in its body, and having a discharge outlet for discharging the electrode slurry from the hollow, wherein the shim member may include a supply groove for supplying the auxiliary coating composition to both ends of the discharge outlet.

In addition, the shim member includes a partition dividing the hollow so that the electrode slurry is divided and discharged to its body, and the partition may be provided with the supply groove for supplying the auxiliary coating composition to the edge of each electrode slurry that is divided and discharged.

Moreover, the supply groove includes a penetrating part penetrating in the thickness direction of the shim member, and the penetrating part may be formed inward from a discharge lip through which the auxiliary coating composition is discharged with a predetermined length.

In addition, the discharge outlet and the discharge lip of the shim member may have a structure in which the discharge outlet and the discharge lip are in contact with each other on the inside with respect to a side of the upper die and the lower die provided with the discharge outlet and the discharge lip.

Advantageous Effects

Since an electrode for a lithium secondary battery according to the present invention is provided with an auxiliary coating layer containing inorganic particles, a phenolic compound and a binder at the end of the electrode mixture layer containing an electrode active material to surround or cover the surface with a predetermined thickness, the thickness variation of the battery is improved in the end of the electrode mixture layer, thereby improving the energy density of the battery. And since the adhesion of the separator at the end of the electrode is improved, it is possible to prevent lithium from being precipitated at the end of the electrode, particularly the negative electrode, and thus there is an advantage of having an excellent safety.

BRIEF DESCRIPTION OF THE DRAWINGS

FIG. 1 is a cross-sectional view showing one end of an electrode mixture layer provided in an electrode for a lithium secondary battery, FIG. 1(*a*) shows a cross-sectional structure of a conventional electrode, and FIG. 1(*b*) shows a cross-sectional structure of an electrode according to the present invention.

FIG. 2 is a perspective view schematically showing a structure of a slot die according to the present invention.

FIG. 3 is a plan view showing an example of a shim member according to the present invention.

FIG. 4 is a perspective view showing a structure of a supply groove provided in a body and/or a partition of a shim member.

FIG. 5 is a plan view showing a discharge outlet and an inlet of a supply groove provided in a shim member.

FIG. 6 and FIG. 7 are cross-sectional views showing structures of the end of electrode mixture layers of a positive electrode and a negative electrode depending on the presence of an auxiliary coating layer, respectively.

BEST MODE FOR CARRYING OUT THE INVENTION

Since the present invention can apply various modifications and have various embodiments, specific embodiments will be exemplified and described in detail in the description.

However, it should be understood that the present invention is not limited to specific embodiments, and includes all modifications, equivalents or alternatives within the spirit and technical scope of the present invention.

The terms "comprise" or "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate, etc. is disposed "on" another part, this includes not only a case in which one part is disposed "directly on" another part, but a case in which a third part is interposed therebetween. In contrast, when a part of a layer, a film, a region or a plate, etc. is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In addition, in the present invention, "contains as a main component" may mean it is 50 wt % or more, 60 wt % or more, 70 wt % or more, 80 wt % or more, 90 wt % or more, 95 wt % or more or 97.5 wt % or more with respect to the total weight of a composition such as slurry, etc. or a specific component, and in some cases, it may mean constituting the entire composition or specific component, that is, 100 wt %.

In addition, as shown in FIG. 1, in the present invention, the electrode mixture layer provided on the electrode current collector slides from the inside to the outside, so when viewing a cross-section of the electrode mixture layer, it forms a certain angle with respect to an electrode current collector, and here, the "sliding angle" of the end of the electrode mixture layer may mean an angle induced at the end of the electrode mixture layer by the sliding of the electrode mixture layer, and may also be referred to as the "end inclination angle" of the electrode mixture layer.

Hereinafter, the present invention will be described in more detail.

Electrode for Lithium Secondary Battery

In an exemplary embodiment, the present invention provides an electrode for a lithium secondary battery, including: an electrode current collector; an electrode mixture layer provided on the electrode current collector, and containing an electrode active material; and an auxiliary coating layer provided on the electrode current collector, and located at the end of the electrode mixture layer, wherein the electrode mixture layer has a deviation ($|a-b|$) between the length of the surface contacting an electrode current collector (a) and the length of the surface not contacting an electrode current collector (b) of 8 mm or less.

An electrode for a lithium secondary battery according to the present invention includes an electrode mixture layer containing an electrode active material on an electrode current collector, and an auxiliary coating layer is provided at an edge, that is, an end of the electrode mixture layer to include a single layer with the electrode mixture layer and the auxiliary coating layer. The electrode of the present invention can improve a sliding phenomenon at the end of the electrode mixture layer as shown in FIG. 1(*b*) by having an auxiliary coating layer at the end of the electrode mixture layer. Accordingly, since the electrode can suppress the occurrence of thickness variation at the end of the electrode mixture layer, an effect of improving the energy density of the battery is excellent. In addition, since the electrode has an increased adhesive strength to the separator at the end, it has an excellent effect of improving durability and/or safety of the battery.

Here, when an electrode slurry for forming the electrode mixture layer is applied to the electrode current collector, the auxiliary coating layer may be prepared by simultaneously applying an auxiliary coating composition for forming the auxiliary coating layer to the edge of the applied electrode slurry.

In addition, the auxiliary coating layer has a shape surrounding or covering the end surface of the electrode mixture layer, and thus has a structure forming a single layer together with the electrode mixture layer. Specifically, the auxiliary coating composition co-applied with the electrode slurry meets the end surface of the electrode slurry to form a shape surrounding or covering the end of the electrode slurry, and by drying the electrode slurry and auxiliary coating composition of this shape, the electrode mixture layer and the auxiliary coating layer are formed. Here, the end surface may mean a region exposed to a side surface of the electrode mixture layer. In addition, the height of the auxiliary coating layer derived from the auxiliary coating composition may have a ratio of 70% to 100% based on the average height of the electrode slurry (or electrode mixture layer), and specifically may have a ratio of 75% to 100%; 80% to 100%; 90% to 100%; 70% to 95%; 70% to 90%; 70% to 85%; or 80% to 90%.

By controlling the shape and/or height of the auxiliary coating layer as described above, the present invention may implement a function of a dam to prevent the edge region of the electrode slurry applied during formation of the electrode mixture layer from being pushed outward due to a sliding phenomenon.

Furthermore, the auxiliary coating layer may include components capable of improving the sliding phenomenon of the end of the electrode mixture layer, and the components may exhibit insulating properties. Specifically, the auxiliary coating layer may include inorganic particles, a phenolic compound, and a binder.

Here, the inorganic particles are the main components of the auxiliary coating layer, and may perform a function of suppressing the sliding phenomenon at the end of the electrode mixture layer. The inorganic particles may include at least one or more kinds of aluminum minerals such as boehmite, gibbsite, diaspore, alunite, and nepheline.

In addition, the phenolic compound can increase the dispersibility of the inorganic particles included in the auxiliary coating layer, while increasing the adhesive strength of the end of the electrode mixture layer to the separator by distributing a large amount of the binder on the surface of the auxiliary coating layer. These phenolic compounds may include one or more kinds among Tannic acid, Baicalein, Luteolin, Taxifolin, Myricetin, Quercetin, Rutin, Catechin, Epigallocatechin gallate, Butein, Piceatannol, Pyrogallic acid, Ellagic acid, Amylose, Amylopectin, and Xanthan gum.

Moreover, the binder may be applied without particular limitation as long as it is commonly used for electrodes for a lithium secondary battery in the art, but specifically, it may include one or more species among polyethylene, polypropylene, polytetrafluoroethylene (PTFE), polyvinylidene fluoride (PVDF), styrene-butadiene rubber (SBR), tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoro methyl vinyl ether-tetrafluoroethylene copolymer, ethylene-acrylic acid copolymer, and carboxymethylcellulose (CMC).

In addition, the content of the inorganic particles and the phenolic compound in the auxiliary coating layer may be controlled to satisfy a certain range. Specifically, the inorganic particles may be included in an amount of 50 wt % or more, 55 wt % or more, 60 wt % or more, 65 wt % or more, 70 wt % or more, 80 wt % or more, 90 wt % or more, 95 wt % or more, or 97.5 wt % or more based on the total weight of the auxiliary coating layer, and more specifically, they may be included in an amount of 50 to 90 wt %, 50 to 80 wt %, 55 to 85 wt %, 50 to 65 wt %, 60 to 80 wt %, 65 to 85 wt %, or 70 to 85 wt % based on the total weight of the auxiliary coating layer.

By controlling the content of the inorganic particles within the above range, the present invention can prevent the effect of suppressing the sliding phenomenon of the electrode mixture layer from becoming insignificant due to a low content, and can prevent a detachment of inorganic particles from the surface of the auxiliary coating layer due to a high content.

Moreover, the phenolic compound may be included in an amount of 0.01 to 5 wt % based on the total weight of the auxiliary coating layer, specifically may be included in an amount of 0.1 to 3 wt %, 1 to 3 wt %, or 1.5 to 2.5 wt %.

By controlling the content of the phenolic compound in the above range, the present invention, in case of a low content, may prevent inorganic particles from aggregating in the auxiliary coating layer or prevent inorganic particles from precipitating caused by phase instability of the coating composition during preparation of the auxiliary coating layer. It may also prevent the deterioration of the adhesive strength of the auxiliary coating layer to the electrode current collector due to a high content thereof.

As an example, the auxiliary coating layer may include 72 to 78 wt % of inorganic particles, 1.8 to 2.2 wt % of a phenolic compound, and 19.8 to 26.2 wt % of a binder.

As described above, in the electrode for a lithium secondary battery according to the present invention, the sliding phenomenon at the end of the electrode mixture layer can be improved by having an auxiliary coating layer at the edge, that is, the end of the electrode mixture layer.

As an example, in the electrode for a lithium secondary battery according to the present invention, both sides of the electrode mixture layer may have a length deviation (|a-b|), that is a deviation between the length of the surface contacting an electrode current collector (a) and the length of the surface not contacting an electrode current collector (b), of 8 mm or less. Specifically, in the electrode, the length deviation (|a-b|) of both sides of the electrode mixture layer may be 7 mm or less, 6 mm or less, 5 mm or less, 4 mm or less, 3 mm or less, 2 mm or less, 1 mm or less, or 0.5 mm or less, and in some cases, may be 0.05 mm or less.

FIG. 1 is a cross-sectional view showing one end of an electrode mixture layer, and in the case where an auxiliary coating layer is not provided, a sliding phenomenon is severe at the end of the electrode mixture layer as shown in FIG. 1(*a*), and accordingly, the deviation (|a-b| or 2c) between the length of the surface in contact with the electrode current collector (a) and the length of the surface not in contact with the electrode current collector (b) exceeds 8 mm. However, the electrode according to the present invention is provided with an auxiliary coating layer to suppress the sliding phenomenon generated at the end of the electrode mixture layer as shown in FIG. 1(*b*), so that the deviation (|a-b| or 2c) between the length of the surface in contact with the electrode current collector (a) and the length of surface not in contact with the electrode current collector (b) is reduced to 8 mm or less.

As an example, when the electrode for a lithium secondary battery according to the present invention is a negative electrode, the deviation (|a-b|) between the length of the surface in contact with the electrode current collector (a) and the length of the surface not in contact with the electrode current collector (b) may be 2.5 to 3.5 mm, and in the case of a positive electrode, it may be 0.05 to 0.5 mm.

In addition, the electrode for a lithium secondary battery of the present invention may have a sliding angle of the end of the electrode mixture layer, that is, an inclination angle of 50° or more. Specifically, the inclination angle of the end of the electrode mixture layer may be 60° or more, 70° or more, 80° or more, 90° or more, or 100° or more, and more specifically, 50° to 120°, 60° to 110°, 70° to 100°, 75° to 95°, or 80° to 95°.

The present invention can control the N/P ratio, which represents the ratio between the capacity of the positive electrode and the capacity of the negative electrode, to have a value of 1 or more by controlling the length deviation of both sides of the electrode mixture layer and/or the inclination angle of the end of the electrode mixture layer within the above range, and accordingly, can improve the safety and the capacity of the battery.

Meanwhile, the electrode for a lithium secondary battery of the present invention can be applied to both a positive electrode and a negative electrode used in a lithium secondary battery.

When the electrode for a lithium secondary battery is a positive electrode, the electrode current collector may be one having a high conductivity without causing a chemical change in the battery. For example, stainless steel, aluminum, nickel, titanium, baked carbon, etc. may be used, and in the case of aluminum or stainless steel, one with the surface treated with carbon, nickel, titanium, silver, etc. may be used.

In addition, the positive electrode current collector may form micro/nano-scaled unevenness on the surface to increase the adhesive strength of the positive electrode active material, and various forms such as films, sheets, foil, nets, porous bodies, foams, and non-woven fabrics, etc. are possible. In addition, the average thickness of the current collector may be appropriately applied in the range of 3 to 500 μm in consideration of the conductivity and the total thickness of the positive electrode to be manufactured.

In addition, the electrode mixture layer provided on the electrode current collector may include a positive electrode active material, and may optionally further include a conductive material, a binder, an additive, and the like, if necessary.

Here, the positive electrode active material is a positive electrode active material capable of reversible intercalation and deintercalation, and may include one or more species among a lithium metal composite oxide represented by Formula 1 below and a lithium iron phosphate represented by Formula 2 below.

$$Li_x[Ni_yCo_zMn_wM^1_v]O_u \quad \text{[Formula 1]}$$

$$LiFe_{1-p}M^2_pPO_q \quad \text{[Formula 2]}$$

In Formulas 1 and 2, $M^1$ is one or more doping elements selected from the group consisting of W, Cu, Fe, V, Cr, Zr, Zn, Al, In, Ta, Y, La, Sr, Ga, Sc, Gd, Sm, Ca, Ce, Nb, Mg, B, and Mo, x, y, z, w, v, and u are $1.0 \le x \le 1.30$, $0.6 \le y < 0.95$, $0.01 < z \le 0.5$, $0.01 < w \le 0.5$, $0 \le v \le 0.2$, $1.5 \le u \le 4.5$, respectively, $M^2$ is one or more doping elements selected from the group consisting of Ni, Co, Mn, and V, and p and q are $0.05 \le p \le 0.5$, $2 \le q \le 6$, respectively.

In one example, the positive electrode active material may include a lithium metal composite oxide including nickel (Ni), cobalt (Co), and manganese (Mn), and in some cases, the lithium metal composite oxide may have a form doped with another transition metal (M'). In a specific example, more specifically, the positive electrode active material may include one or more species selected from the group consisting of $Li(Ni_{0.6}Co_{0.2}Mn_{0.2})O_2$, $Li(Ni_{0.7}Co_{0.15}Mn_{0.15})O_2$, $Li(Ni_{0.8}Co_{0.1}Mn_{0.1})O_2$, $Li(Ni_{0.9}Co_{0.05}Mn_{0.05})O_2$, $Li(Ni_{0.6}Co_{0.2}Mn_{0.1}Zr_{0.1})O_2$, $Li(Ni_{0.6}Co_{0.2}Mn_{0.15}Zr_{0.05})O_2$, and $Li(Ni_{0.7}Co_{0.1}Mn_{0.1}Zr_{0.1})O_2$.

In another example, the positive electrode active material may include lithium phosphate containing iron, and in some cases, the lithium phosphate may have a form doped with another transition metal ($M^2$). For example, the lithium iron phosphate may include one or more species among $LiFePO_4$, $LiFe_{0.8}Mn_{0.2}PO_4$, and $LiFe_{0.5}Mn_{0.5}PO_4$.

The content of the positive electrode active material with respect to 100 parts by weight of the positive electrode mixture layer may be 85 to 95 parts by weight, specifically 88 to 95 parts by weight, 90 to 95 parts by weight, 86 to 90 parts by weight, or 92 to 95 parts by weight.

Moreover, the conductive material is used to improve the electrical performance of the positive electrode, and those commonly used in the art can be applied, but specifically, may include one or more specifies selected from the group consisting of natural graphite, artificial graphite, carbon black, acetylene black, Denka black, Ketjen black, super-P, channel black, furnace black, lamp black, thermal black, graphene, and carbon nanotube.

As an example, as the conductive material, carbon black or Denka black may be used alone or in combination.

In addition, the conductive material with respect to 100 parts by weight of the positive electrode mixture layer may be included in an amount of 0.1 to 5 parts by weight, and specifically, may be included in an amount of 0.1 to 4 parts by weight; 2 to 4 parts by weight; 1.5 to 5 parts by weight; 1 to 3 parts by weight; 0.1 to 2 parts by weight; or 0.1 to 1 part by weight.

Moreover, the binder serves to bind the positive electrode active material, the positive electrode additive, and the conductive material to each other, and any binder having such a function may be used without particular limitation. Specifically, the binder may include one or more resins selected from the group consisting of polyvinylidene fluoride-hexafluoropropylene copolymer (PVdF-co-HFP), polyvinylidene fluoride (PVdF), polyacrylonitrile, polymethylmethacrylate, and copolymers thereof. As an example, the binder may include polyvinylidene fluoride.

In addition, the binder with respect to 100 parts by weight of the electrode mixture layer may be included in an amount of 1 to 10 parts by weight, and specifically may be included in an amount of 2 to 8 parts by weight; or may include 1 to 5 parts by weight of the conductive material.

Moreover, the average thickness of the electrode mixture layer is not particularly limited, but may be specifically 50 μm to 300 μm, more specifically 100 μm to 200 μm; 80 μm to 150 μm; 120 μm to 170 μm; 150 μm to 300 μm; 200 μm to 300 μm; or 150 μm to 190 μm.

When the electrode for a lithium secondary battery is a negative electrode, the electrode current collector is not particularly limited as long as it does not cause chemical change in the battery and has high conductivity. For example, copper, stainless steel, nickel, titanium, baked carbon, etc. may be used, and in the case of copper or stainless steel, one with the surface treated with carbon, nickel, titanium, silver, etc. may be used.

In addition, the negative electrode current collector, the same as the positive electrode current collector, may form micro/nano-scaled unevenness on the surface to increase the adhesive strength to the negative electrode active material, and various forms such as films, sheets, foil, nets, porous bodies, foams, and non-woven fabrics, etc. are possible. In addition, the average thickness of the negative electrode current collector may be appropriately applied in the range of 3 to 500 μm in consideration of the conductivity and the total thickness of the negative electrode to be manufactured.

Moreover, the negative electrode active material may include, for example, one or more species among a carbon material and a silicon material. The carbon material refers to a carbon material containing carbon atoms as the main component, and examples of the carbon material may include one or more species selected from the group consisting of graphite having a completely layered crystal structure such as natural graphite, soft carbon having a graphene structure (a structure in which a hexagonal honeycomb plane of carbon is layered), and hard carbon, artificial graphite, expanded graphite, carbon fiber, non-graphitizable carbon, carbon black, acetylene black, Ketjen black, carbon nanotube, fullerene, activated carbon, graphene, carbon nanotube, etc. in which the above-described structures are mixed with amorphous parts. More preferably, the carbon material includes one or more species selected from the group consisting of natural graphite, artificial graphite, graphene and carbon nanotube. More preferably, the carbon material includes natural graphite and/or artificial graphite, and may include one or more among graphene and carbon nanotube together with the natural graphite and/or the artificial graphite. In this case, the carbon material may include 0.1 to 10 parts by weight of graphene and/or carbon nanotube with respect to 100 parts by weight of the total carbon material, and more specifically, may include 0.1 to 5 parts by weight; or 0.1 to 2 parts by weight of graphene and/or carbon nanotube with respect to 100 parts by weight of the total carbon material.

In addition, the silicon material is a particle containing silicon (Si) as a main component as a metal component, and may include one or more species among silicon (Si) particles and silicon oxide ($SiO_X$, $1 \le X \le 2$) particles. As an example, the silicon material may include silicon (Si) particles, silicon monoxide (SiO) particles, silicon dioxide ($SiO_2$) particles, or a mixture of these particles.

In addition, when the silicon material is applied as a negative electrode active material together with the carbon material, it may be included in an amount of 1 to 20 parts by weight with respect to 100 parts by weight of the negative electrode mixture layer, and specifically, with respect to 100 parts by weight of the negative electrode mixture layer, may be included in an amount of 5 to 20 parts by weight; 3 to 10 parts by weight; 8 to 15 parts by weight; 13 to 18 parts by weight; or 2 to 7 parts by weight.

By adjusting the content of the silicon material included in the negative electrode active material within the above range, the present invention may improve the charging capacity per unit mass while reducing lithium consumption and irreversible capacity loss during the initial charging and discharging of the battery.

As an example, with respect to 100 parts by weight of the negative electrode mixture layer, the negative electrode active material may include: 95±2 parts by weight of a graphite; and 5±2 parts by weight of a mixture in which silicon monoxide (SiO) particles and silicon dioxide ($SiO_2$) particles are uniformly mixed. By adjusting the contents of the carbon material and the silicon material included in the negative electrode active material within the above ranges, the present invention may improve the charging capacity per unit mass while reducing lithium consumption and irreversible capacity loss during the initial charging and discharging of the battery.

In addition, the negative electrode mixture layer may have an average thickness of 100 μm to 200 μm, specifically having an average thickness of 100 μm to 180 μm, 100 μm to 150 μm, 120 μm to 200 μm, 140 μm to 200 μm, or 140 μm to 160 μm.

Since the electrode for a lithium secondary battery according to the present invention has the above structure, the thickness deviation at the end of the electrode mixture layer is improved, which leads to an improvement in the energy density of the battery, and since the adhesive strength of the separator at the end of the electrode is improved, precipitation of lithium at the end of the electrode, especially the negative electrode, can be prevented, thereby having an advantage of having an excellent safety.

Manufacturing Method of Electrode for Lithium Secondary Battery

In addition, in an exemplary embodiment, the present invention provides a manufacturing method of an electrode for a lithium secondary battery, including:

preparing of an electrode having an auxiliary coating layer disposed at the end of an electrode mixture layer containing an electrode active material by simultaneously coating an electrode slurry containing an electrode active material, and an auxiliary coating composition on an electrode current collector, wherein the electrode mixture layer has a deviation ($|a-b|$) between the length of the surface contacting an electrode current collector (a) and the length of the surface not contacting an electrode current collector (b) of 8 mm or less.

The manufacturing method of an electrode for a lithium secondary according to the present invention is a method for manufacturing the above-described electrode for a lithium secondary battery, which includes preparation of an electrode containing an electrode mixture layer including an electrode active material by simultaneously coating an electrode slurry containing an electrode active material, and an auxiliary coating composition on an electrode current collector and having a structure in which an auxiliary coating layer is disposed at the end thereof.

By simultaneously coating the electrode slurry for forming the electrode mixture layer and the auxiliary coating composition for forming the auxiliary coating layer provided at the end of the electrode mixture layer, the present invention can improve the sliding phenomenon at the end of the electrode mixture layer when forming the electrode mixture layer. Accordingly, since the present invention is capable of suppressing the occurrence of thickness deviation at the end of the electrode mixture layer, it has an excellent effect of improving the energy density of the battery. In addition, since the prepared electrode has an increased adhesive strength at the end to a separator, it has an excellent effect of improving the durability and/or safety of the battery.

As an example, in the electrode for a lithium secondary battery according to the present invention, both sides of the electrode mixture layer may have a length deviation (|a-b|), that is a deviation between the length of the surface contacting an electrode current collector (a) and the length of the surface not contacting an electrode current collector (b), of 8 mm or less. Specifically, in the electrode, the length deviation (|a-b|) of both sides of the electrode mixture layer may be 7 mm or less, 6 mm or less, 5 mm or less, 4 mm or less, 3 mm or less, 2 mm or less, 1 mm or less or 0.5 mm or less, and in some cases, may be 0.05 mm or less.

In the electrode manufacturing method according to the present invention, the auxiliary coating composition may include inorganic particles, a phenolic compound, and a binder.

Specifically, as a main component of the auxiliary coating layer, the inorganic particles may perform a function of suppressing a sliding phenomenon at the end of the electrode mixture layer. The inorganic particles may include one or more kinds of aluminum mineral such as boehmite, gibbsite, diaspore, alunite, and nepheline.

In addition, the phenolic compound can increase the dispersibility of the inorganic particles included in the auxiliary coating layer, while increasing the adhesive strength of the end of the electrode mixture layer to the separator by distributing a large amount of the binder on the surface of the auxiliary coating layer. These phenolic compounds may include one or more kinds among Tannic acid, Baicalein, Luteolin, Taxifolin, Myricetin, Quercetin, Rutin, Catechin, Epigallocatechin gallate, Butein, Piceatannol, Pyrogallic acid, Ellagic acid, Amylose, Amylopectin, and Xanthan gum.

Moreover, the binder may be applied without particular limitation as long as it is commonly used for lithium secondary battery electrodes in the art, but specifically, it may include one or more species among polyethylene, polypropylene, polytetrafluoroethylene (PTFE), polyvinylidene fluoride (PVDF), styrene-butadiene rubber (SBR), tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoro methyl vinyl ether-tetrafluoroethylene copolymer, ethylene-acrylic acid copolymer, and carboxymethylcellulose (CMC).

In addition, the content of the inorganic particles and the phenolic compound in the auxiliary coating composition may be controlled to satisfy a certain range. Specifically, the inorganic particles based on the total weight of the auxiliary coating composition may be included in an amount of 50 wt % or more, 55 wt % or more, 60 wt % or more, 65 wt % or more, 70 wt % or more, 80 wt % or more, 90 wt % or more, 95 wt % or more, or 97.5 wt % or more, and more specifically, based on the total weight of the auxiliary coating layer they may be included in an amount of 50 to 90 wt %, 50 to 80 wt %, 55 to 85 wt %, 50 to 65 wt %, 60 to 80 wt %, 65 to 85 wt %, or 70 to 85 wt %.

By controlling the content of the inorganic particles within the above range, the present invention can prevent the effect of suppressing the sliding phenomenon of the electrode mixture layer from becoming insignificant due to a low content, and can prevent a detachment of inorganic particles from the surface of the auxiliary coating layer due to a high content.

Moreover, the phenolic compound based on the total weight of the auxiliary coating layer may be included in an amount of 0.01 to 5 wt %, specifically may be included in an amount of 0.1 to 3 wt %, 1 to 3 wt %, or 1.5 to 2.5 wt %.

By controlling the content of the phenolic compound in the above range, the present invention may prevent inorganic particles from aggregating in the auxiliary coating composition due to a low content, or prevent inorganic particles from precipitating due to phase instability of the coating composition during preparation of the auxiliary coating composition. It may also prevent the deterioration of the adhesive strength of the auxiliary coating layer to the electrode current collector due to a high content thereof.

As an example, the auxiliary coating composition may include 72 to 78 wt % of inorganic particles, 1.8 to 2.2 wt % of a phenolic compound, and 19.8 to 26.2 wt % of a binder.

Furthermore, coatings of the electrode slurry and the auxiliary coating composition may be performed by a simultaneous coating method commonly applied in the art, but may be specifically implemented by a slot die as shown in FIG. 2.

The slot die 100 includes an upper die 110 having a chamber accommodating an electrode slurry; a lower die 120 facing the upper die; a plate-shaped shim member 130 located between the upper die and the lower die, having a hollow connected to a chamber C in the body, and having a discharge outlet for discharging the electrode slurry from the hollow, wherein the shim member 130 may include a supply groove 135 for supplying an auxiliary coating composition to both ends of a discharge outlet 134.

Here, the upper die 110 and the lower die 120 are coupled to each other to form a die unit. The upper die 110 and the lower die 120 may be directly coupled to each other, but may also be coupled indirectly through an intermediate medium or the like. The upper die 110 and the lower die 120 are coupled to each other at an edge portion, forming an inner space, that is, a chamber. Here, the inner space is a space where the electrode slurry is accommodated and stayed before being discharged to the outside through the discharge outlet.

In addition, the shim member 130 is interposed between the upper die 110 and the lower die 120 when the upper die 110 and the lower die 120 are coupled, and has a hollow 132 in which the center part is opened, so that it can be connected to the chamber made by the die part. Through this, both the chamber and the hollow form a space in which the electrode slurry is accommodated.

FIG. 3 is an example showing a flat structure of the shim member 130 according to the present invention, the shim 130 has a plate-shaped body 131, and the body 131 has a hollow 132 connected to the chamber of the upper die of the die. The hollow 132 includes a discharge outlet 134 for discharging an electrode slurry supplied from the chamber to one side of the body 131, and is provided with a supply groove 135 for supplying an auxiliary coating composition to both ends of the discharge outlet 134. That is, the supply groove 135 for supplying an auxiliary coating composition to both sides of the discharge outlet 134 may be further included on one side of the body 131 on which the discharge outlet 134 is formed.

Here, as shown in FIGS. 3(*b*) and (*c*), the shim member 130 may include one or more partitions 133 dividing the hollow 132 so that the electrode slurry is divided and discharged to the body 131. The partition may be provided with a supply groove 135 for supplying an auxiliary coating composition at the edge of each electrode slurry that is divided and discharged. By having a partition 133 dividing the hollow, the shim member 130 may be multi-row coated, and the supply groove 135 provided in the partition 133 may include two discharge lips 136 at the lower end of a single partition 133 so that the auxiliary coating composition can be supplied adjacent to both edges of the discharged electrode slurry.

In addition, FIG. 4 is a perspective view showing a structure of a supply groove 235 provided in a body 231 and/or a partition 233 of a shim member, and while the supply groove 235 is provided in the body 231 and/or the partition 233 of the shim member 230 to supply an auxiliary coating composition to both sides of the discharge outlet 234, it includes a penetrating part 237 penetrating in the thickness direction of the shim member 230, and the penetrating part 237 may have a structure formed inward to the body from an inlet of the supply groove 235, that is, the discharge lip 236 through which the auxiliary coating composition is discharged, with a predetermined length.

Conventionally, a shim member used in a slot die applied in the art includes a discharge outlet and/or a supply groove, wherein the discharge outlet and the supply groove have a partially blocked structure so that they have a height difference with a predetermined length from the discharge lip of the supply groove to the inside like a groove in order for the auxiliary coating composition to arrange the height of the passage through which the auxiliary coating composition is finally supplied to be higher than the height of the passage of the electrode slurry. In this case, since the amount of the composition remaining in the slot die increases due to the height difference of the discharge lip through which the auxiliary coating composition is discharged, the electrode slurry can be more stably uniform-coated when forming the electrode mixture layer. However, as described above, when the height of the passage is higher than the discharge outlet through which the electrode slurry is discharged by inducing a height difference at the inlet of the supply groove, the auxiliary coating composition is coated while tilted toward the downstream side, so there is a problem that the auxiliary coating layer cannot sufficiently prevent the sliding phenomenon of the electrode mixture layer.

However, since the shim member 230 used in the present invention is provided with the supply groove 235 to have the penetrating part 237 penetrated inward in the thickness direction of the shim member at the inlet through which the auxiliary coating composition is discharged with a predetermined length, it allows the auxiliary coating composition to increase the amount of the composition staying inside the slot die, as well as to prevent the auxiliary coating composition from being coated while being tilted toward the downstream side.

Furthermore, FIG. 5 is a plan view showing the structures of a discharge outlet 334 and an inlet (that is, a discharge lip 336) of a supply groove 335 provided in a shim member 330, and while the shim member 330 is disposed between the upper die and the lower die, it may be located inside the upper die and the lower die, where the surfaces on which the discharge outlet 334 for discharging an electrode slurry and the discharge lip 336 for discharging an auxiliary coating composition are overlapped.

Specifically, when the shim member is interposed between the upper die and the lower die, the discharge lip 336 for discharging the auxiliary coating composition may be provided at both inner ends of the discharge outlet 334 for discharging the electrode slurry. Accordingly, the discharge outlet 334 and the discharge lip 336 provided in the shim member may have a structure in which they meet at a point 338 spaced inward by a predetermined length with respect to one side of the upper die and the lower die where they are located.

Here, the discharge outlet 334 and the discharge lip 336 may meet at a point that is are recessed by 10 μm to 1,000 μm with respect to one overlapped side surface of the upper die and lower die (e.g., surface perpendicular to the contact surface of the upper die and lower die), more specifically may meet at a point that is inwardly recessed by 50 μm to 750 μm; 50 μm to 500 μm; 200 μm to 400 μm; or 80 μm to 200 μm.

By having the discharge outlet 334 and the discharge lip 336 of the shim member 330 exist inside the upper die and the lower die, the present invention can simultaneously discharge the electrode slurry supplied from the discharge outlet and the auxiliary coating composition supplied from the supply groove in a state in which they meet each other inside the die before they reach the electrode current collector. Accordingly, since the simultaneously discharged auxiliary coating composition can implement a shape that surrounds or covers the end surface at a height ratio of 70% to 100% compared to the average height of the applied electrode slurry, it can more effectively prevent the sliding phenomenon of the electrode slurry. However, as in the present invention, in the case where the discharge outlet 334 and the discharge lip 336 do not contact inside the upper die and the lower die, and the discharge lip 336 is simultaneously discharged at both ends of the outer side of the body where the discharge outlet 334 is formed, the auxiliary coating composition is not formed with a sufficient thickness at the end of the electrode slurry compared to the average height of the electrode slurry to be applied, so there is a limitation that it is difficult to sufficiently express the dam function of the auxiliary coating composition.

Since the method for manufacturing a lithium secondary battery according to the present invention has the above-described configuration, it is possible to improve the sliding phenomenon of the electrode slurry constituting the electrode mixture layer, thereby improving the thickness deviation at the end of the electrode mixture layer, increasing the energy density of the battery, and improving the adhesive strength of the separator at the end of the electrode, it has an advantage of excellent safety in that it is possible to prevent lithium from being precipitated at the end of the electrode, particularly the negative electrode.

MODE FOR CARRYING OUT THE INVENTION

Hereinafter, the present invention will be described in more detail with reference to Examples and Experimental Examples.

However, the following Examples and Experimental Examples are merely illustrative of the present invention, and the content of the present invention is not limited to the following Examples and Experimental Examples.

Preparation Examples 1 to 4. Preparation of Auxiliary Coating Composition

An auxiliary coating composition was prepared by preparing boehmite, tannic acid, styrene butadiene rubber (SBR) and polyvinylidene fluoride (PVdF), weighing them as shown in Table 1 below, and mixing them in N-methyl pyrrolidone. At this time, the solid content of each auxiliary coating composition prepared was adjusted as shown in Table 1.

TABLE 1

| Unit: wt % | Boehmite | PVdF | Tannic acid | Solid content |
|---|---|---|---|---|
| Preparation Example 1 | 50~89.9 | 10~40 | 0.1~10 | 25% |
| Preparation Example 2 | 60~90 | 10~40 | 0 | 25% |
| Preparation Example 3 | 30~49.9 | 41~79.9 | 0.1~10 | 12.7% |

Examples 1 to 5 and Comparative Example 1. Preparation of Electrode for Lithium Secondary Battery In order to prepare a positive electrode for a lithium secondary battery, as a positive electrode current collector, an aluminum sheet (average thickness: 30 μm) was prepared, and as a positive electrode slurry, 97.5 parts by weight of $LiNi_{0.7}Co_{0.1}Mn_{0.2}O_2$ as a positive electrode active material; 1 part by weight of carbon nanotube as a conductive material; 1.5 parts by weight of PVdF as a binder were weighed, and were mixed with N-methyl pyrrolidone.

Separately, in order to prepare a negative electrode for a lithium secondary battery, as a negative electrode current collector, a copper sheet (average thickness: 30 μm) was prepared and as a negative electrode slurry, 60 to 99 parts by weight of artificial graphite as a negative electrode active material; 0.5 to 20 parts by weight of carbon nanotubes and carbon black as conductive materials; and 0.2 to 20 parts by weight of styrene butadiene rubber (SBR) as a binder were weighed and mixed with water.

An electrode for a lithium secondary battery was prepared by fixing each electrode current collector to a coating device provided with a slot die, and supplying the electrode slurry and the auxiliary coating composition prepared in Preparation Example through the slot die. Here, the type of electrode prepared and the type of auxiliary coating composition supplied through the slot die are shown in Table 2 below. In addition, the slot die that was used has a structure in which an upper die and a lower die having a chamber are coupled, a shim member is interposed between the upper die and the lower die, and the shim member has a hollow connected to the chamber in a plate-shaped body. Specifically, as shown in FIG. 3(*b*), the structure of the shim member has a discharge outlet through which the electrode slurry supplied through the hollow on one side, and includes a partition dividing the hollow so that the discharged electrode slurry is divided and supplied. In addition, in order to have the auxiliary coating composition prepared in the Preparation Example discharge from both sides of each discharge outlet (first discharge outlet and second discharge outlet) divided by the partition, supply grooves are provided on the partition and the end inner surface of the body disposed in parallel with the partition. The supply groove has two discharge lips in the body, and one in the partition, and has a structure in which a penetrating part is formed about 0.5 to 2 mm inward from the inlet of the supply groove penetrating in the thickness direction of the shim member. In addition, as shown in FIG. 5, the discharge lip to which the auxiliary coating composition is supplied may have a shape 338 in which the end inner surface of the body disposed in parallel with a partition and the partition is inwardly recessed about 100 μm with respect to the side surface of the upper die and the lower die, so that it can be positioned inside the upper die and the lower die.

TABLE 2

| | Type of Electrode | Type of Auxiliary Coating Composition |
|---|---|---|
| Example 1 | Positive Electrode | Auxiliary coating composition of Preparation Example 1 |
| Example 2 | Negative Electrode | Auxiliary coating composition of Preparation Example 1 |
| Example 3 | Positive Electrode | Auxiliary coating composition of Preparation Example 2 |
| Example 4 | Negative Electrode | Auxiliary coating composition of Preparation Example 2 |
| Example 5 | Positive Electrode | Auxiliary coating composition of Preparation Example 3 |
| Comparative Example 1 | Negative Electrode | Auxiliary coating composition of Preparation Example 3 |

Comparative Examples 2 to 5. Preparation of Electrode for Lithium Secondary Battery Using a shim member without a supply groove, an electrode slurry was applied on an electrode current collector by a slot die, and an auxiliary coating composition of Table 3 below was applied to the edge of the continuously applied electrode slurry to prepare an electrode for a lithium secondary battery.

TABLE 3

| | Type of Electrode | Type of Auxiliary Coating Composition |
|---|---|---|
| Comparative Example 2 | Positive Electrode | Auxiliary coating composition of Preparation Example 1 |
| Comparative Example 3 | Negative Electrode | Auxiliary coating composition of Preparation Example 1 |
| Comparative Example 4 | Positive Electrode | Auxiliary coating composition of Preparation Example 3 |
| Comparative Example 5 | Negative Electrode | Auxiliary coating composition of Preparation Example 3 |

Experimental Example

In order to evaluate the effect of improving the sliding phenomenon at the end of the electrode mixture layer of the electrode for a lithium secondary battery according to the present invention, scanning electron microscopy (SEM) was performed on the cross-sections of the electrodes prepared in Examples and Comparative Example, respectively. From the photographed images, ① the deviation (|a-b|) between the length of the surface of each electrode mixture layer in contact with the electrode current collector (a) and the length of the surface not in contact with the electrode current collector (b); and ② the sliding angle at the end (i.e., "inclination angle") were analyzed, and the results are shown in FIG. 6 and FIG. 7, and Table 4 below.

TABLE 4

| | Length deviation between the upper and lower surfaces of electrode mixture layer | Sliding angle |
|---|---|---|
| Example 1 | 0.8 mm | 87° |
| Example 2 | 6.0 mm | 83° |

TABLE 4-continued

| | Length deviation between the upper and lower surfaces of electrode mixture layer | Sliding angle |
|---|---|---|
| Example 3 | 1.2 mm | 60° |
| Example 4 | 7.3 mm | 60° |
| Example 5 | 4.5 mm | 55° |
| Comparative Example 1 | 10.0 mm | 60° |
| Comparative Example 2 | 8.5 mm | 65° |
| Comparative Example 3 | 9.0 mm | 60° |
| Comparative Example 4 | 12.0 mm | 50° |
| Comparative Example 5 | 10.0 mm | 55° |

As shown in Table 4 above and FIG. 6 and FIG. 7 below, it can be seen that the electrode for a lithium secondary battery according to the present invention has an improved sliding phenomenon at the end of the electrode mixture layer.

Specifically, when forming the electrode mixture layer according to the present invention, the electrode of the Example in which the auxiliary coating layer is simultaneously coated at the end of the electrode mixture layer has a deviation (|a-b|) between the length of the surface of the electrode mixture layer in contact with the electrode current collector (a) and the length of the surface not in contact with the electrode current collector (b), that is, the length deviation (|a-b|) between the upper and lower surfaces of the electrode mixture layer, of less than 2 mm in the case of a positive electrode, specifically 1.2 mm or less, and less than 8 mm in the case of a negative electrode, specifically 7.5 mm or less. In addition, it was confirmed that the sliding angles of the electrodes of the Examples 1 and 2 exceeded 80° for both the positive and negative electrodes.

From these results, it can be seen that the electrode for a lithium secondary battery according to the present invention, by having an auxiliary coating layer containing inorganic particles, a phenolic compound, and a binder at the end of the electrode mixture layer containing the electrode active material, can increase the energy density of the battery due to an improvement in the thickness deviation at the end of the electrode mixture layer, and increase the adhesive strength of the separator at the end of the electrode, thereby preventing lithium from being deposited at the electrode, particularly at the end of the negative electrode.

As described above, the present invention has been described with reference to exemplary embodiments, but it should be understood by those skilled in the art or those of ordinary skill in the art that the present invention can be variously modified and changed without departing from the spirit and technical scope of the present invention described in the accompanying claims.

Therefore, the technical scope of the present invention should not be limited to the contents described in the detailed description of the specification, but should be defined by the claims.

REFERENCE NUMERALS

11: AN ELECTRODE CURRENT COLLECTOR
12: AN ELECTRODE MIXTURE LAYER
13: AN AUXILIARY COATING LAYER
100: SLOT DIE
110: UPPER DIE
120: LOWER DIE
130, 230 and 330: SHIM MEMBER
131, 231 and 331: BODY
132: HOLLOW

133, 233 and 333: PARTITION
134 and 334: DISCHARGE OUTLET
135, 235 and 335: SUPPLY GROOVE
136, 236 and 336: DISCHARGE LIP
237: PENETRATING PART
338: SEPARATION DISTANCE AT A POINT WHERE DISCHARGE OUTLET AND DISCHARGE LIP MEET
C: CHAMBER

The invention claimed is:

1. An electrode for a lithium secondary battery, comprising:

an electrode current collector;

an electrode mixture layer provided on the electrode current collector, and containing an electrode active material; and an auxiliary coating layer provided on the electrode current collector, and located at the end of an electrode mixture layer, wherein the electrode mixture layer has an absolute value (|a-b|) of 8 mm or less, wherein a is a length of a surface of the electrode mixture layer which is in contact with the electrode current collector, and b is a length of an opposite surface of the electrode mixture layer which is not in contact with the electrode current collector, and wherein the auxiliary coating layer contains an inorganic particle, a phenolic compound, and a binder.

2. The electrode for a lithium secondary battery of claim 1, wherein the inorganic particle comprises one or more of aluminum mineral chosen from boehmite, gibbsite, diaspore, alunite, and nepheline.

3. The electrode for a lithium secondary battery of claim 1, wherein the phenolic compound comprises one or more chosen from tannic acid, baicalein, luteolin, taxifolin, myricetin, quercetin, rutin, catechin, epigallocatechin gallate, butein, piceatannol, pyrogallic acid, ellagic acid, amylose, amylopectin, and xanthan gum.

4. The electrode for a lithium secondary battery of claim 1, wherein the auxiliary coating layer contains inorganic particles in an amount of 50 parts by weight or more based on a total weight of the auxiliary coating layer.

5. The electrode for a lithium secondary battery of claim 1, wherein the auxiliary coating layer has a structure surrounding an end surface of the electrode mixture layer and forms a single layer.

6. The electrode for a lithium secondary battery of claim 1, wherein the auxiliary coating layer has a thickness of 70% to 100% of an average thickness of the electrode mixture layer.

7. The electrode for a lithium secondary battery of claim 1, wherein an end of the electrode mixture layer has an inclination angle of 50° or more.

8. A method of manufacturing an electrode for a lithium secondary battery, comprising:

preparing of an electrode having an auxiliary coating layer disposed at an end of an electrode mixture layer containing an electrode active material by simultaneously coating an electrode slurry containing the electrode active material, and an auxiliary coating composition on an electrode current collector, wherein the electrode mixture layer has an absolute value (|a-b|) of 8 mm or less, wherein a is a length of a surface of the electrode mixture layer which is in contact with the electrode current collector, and b is a length of an opposite surface of the electrode mixture layer which is not in contact with the electrode current collector, and wherein the auxiliary coating composition contains an inorganic particle, a phenolic compound and a binder.

9. The method of manufacturing the electrode for the lithium secondary battery of claim 8, wherein the inorganic particles are included in an amount of 50 parts by weight or more based on a total weight of the auxiliary coating composition.

10. The method of manufacturing the electrode for the lithium secondary battery of claim 8, wherein the phenolic compound contains one or more chosen from tannicacid, baicalein, luteolin, taxifolin, myricetin, quercetin, rutin, catechin, epigallocatechin gallate, butein, piceatannol, pyrogallic acid, ellagic acid, amylose, amylopectin, and xanthan gum.

11. The method of manufacturing the electrode for the lithium secondary battery of claim 8, wherein the phenolic compound is included in an amount of 0.1 to 5 parts by weight based on a total weight of the auxiliary coating composition.

12. The method of manufacturing the electrode for the lithium secondary battery of claim 8, wherein the simultaneously coatings the electrode slurry and the auxiliary coating composition comprises simultaneously discharging the electrode slurry and the auxiliary coating composition by a slot die, and wherein the slot die comprises an upper die having a chamber accommodating the electrode slurry; a lower die facing the upper die; a plate-shaped shim member located between the upper die and the lower die, having a hollow connected to a chamber in its body, and having a discharge outlet for discharging the electrode slurry from the hollow, wherein the shim member includes a supply groove for supplying an auxiliary coating composition to both ends of the discharge outlet.

13. The method of manufacturing the electrode for the lithium secondary battery of claim 12, wherein the shim member comprises a partition dividing the hollow so that the electrode slurry is divided and discharged to its body, and wherein the partition is provided with a supply groove for supplying an auxiliary coating composition to the edge of each electrode slurry that is divided and discharged.

14. The method of manufacturing the electrode for the lithium secondary battery of claim 13, wherein the supply groove comprises a penetrating part penetrating in a thickness direction of the shim member, and wherein the penetrating part is formed inwardly from the discharge lip through which the auxiliary coating composition is discharged with a predetermined length.

15. The method of manufacturing the electrode for the lithium secondary battery of claim 14, wherein the discharge outlet and the discharge lip of the shim member have a structure in which the discharge outlet and the discharge lip meet on the inside with respect to a side of the upper die and the lower die provided with the discharge outlet and the discharge lip.

* * * * *